UNITED STATES PATENT OFFICE.

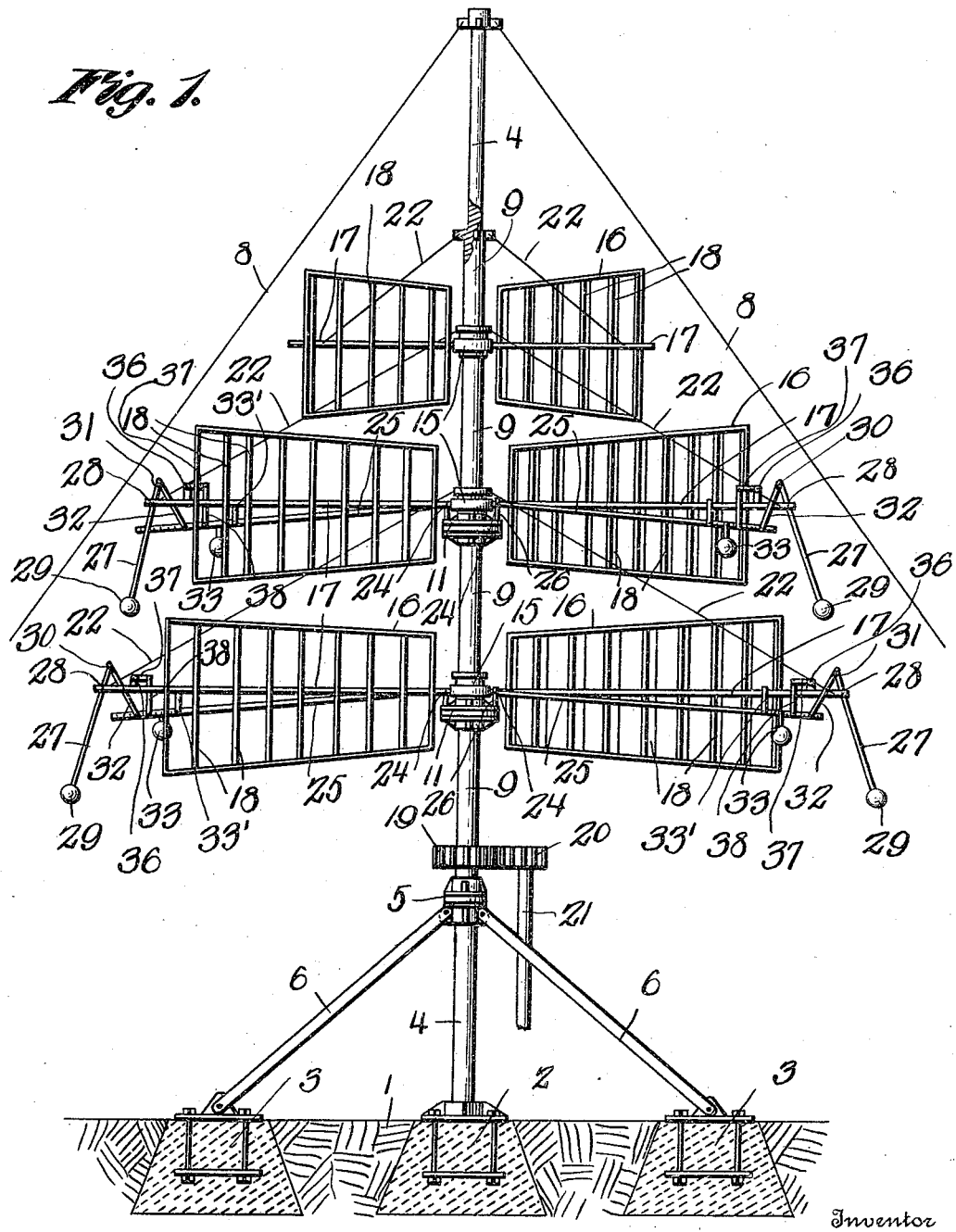

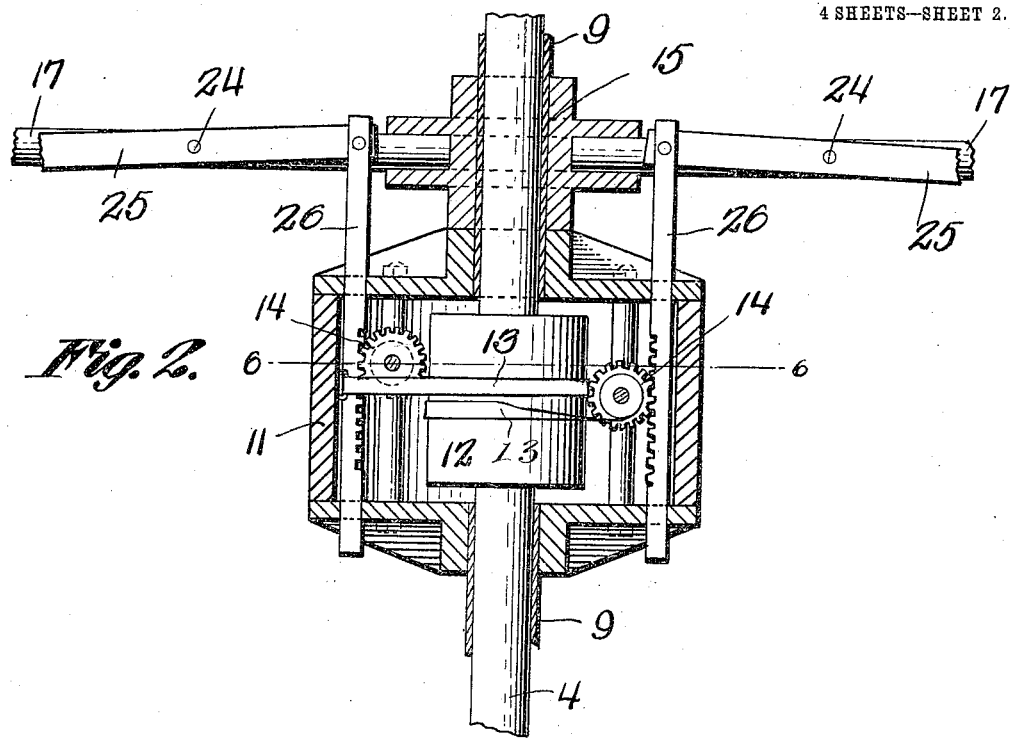
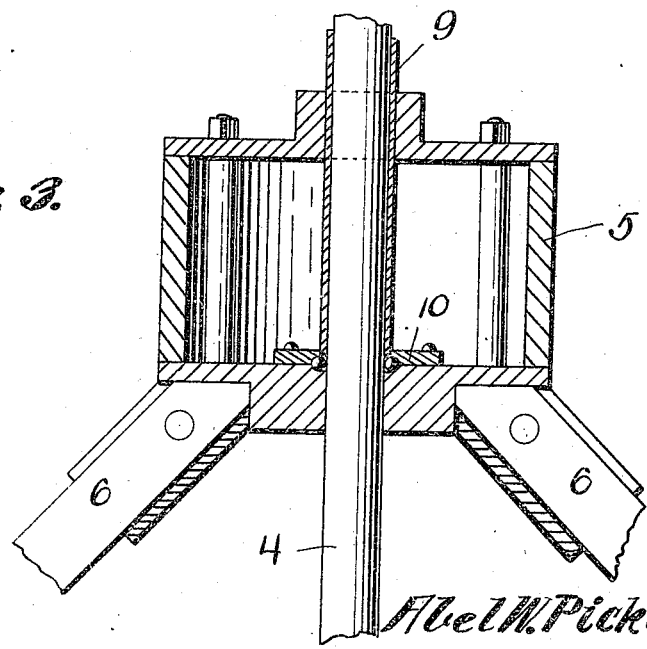

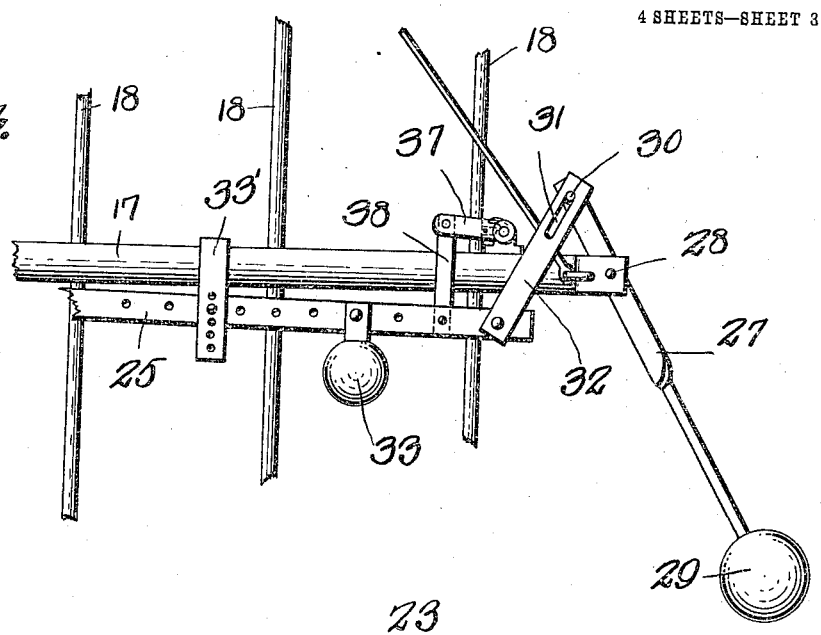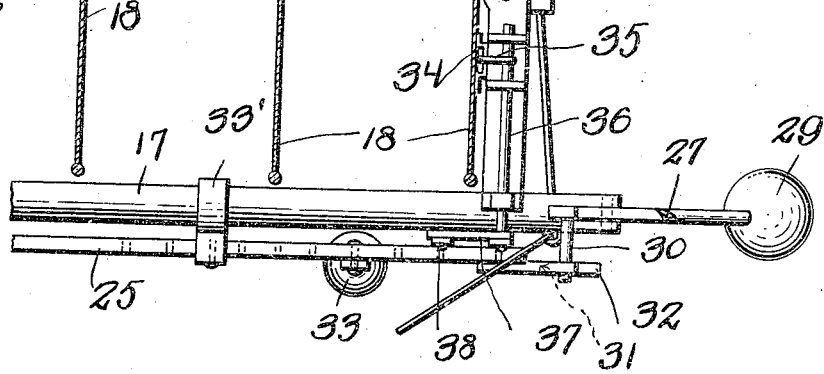

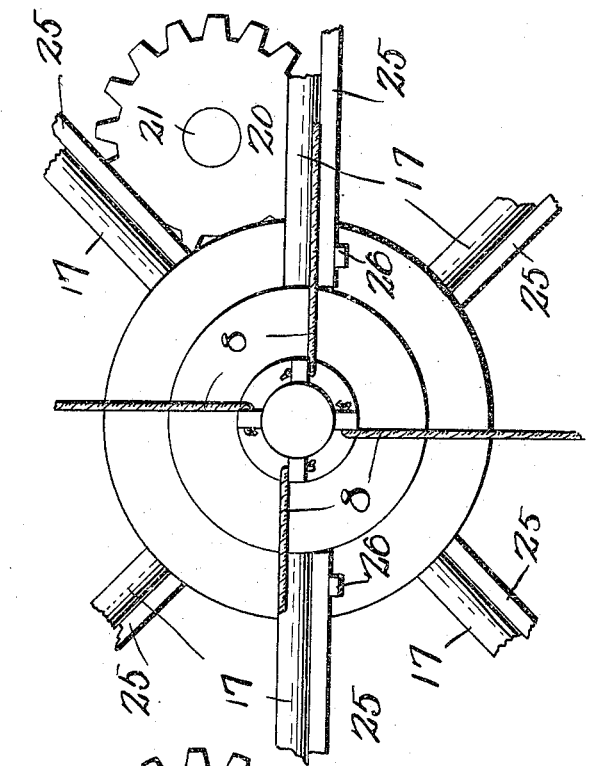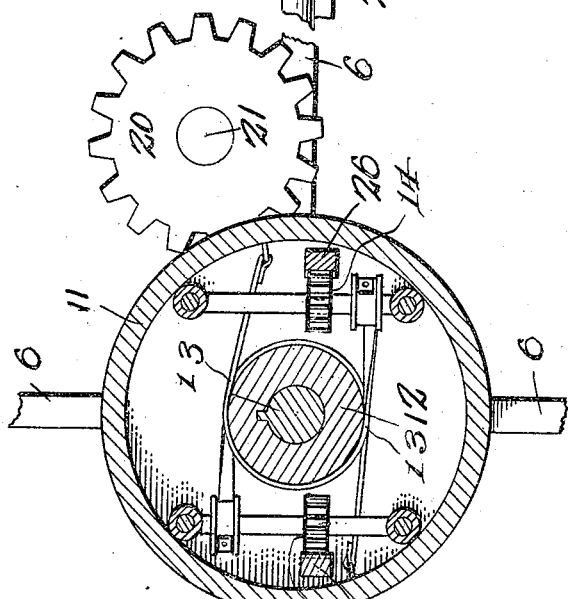

ABEL W. PICKERING, OF JOPLIN, MISSOURI, ASSIGNOR OF ONE-SIXTH TO ALVA A. RUSSELL, ONE-SIXTH TO THOMAS A. MOON, AND ONE-SIXTH TO W. ROSCOE HAUGHAWOUT, ALL OF JOPLIN, MISSOURI.

WIND-MOTOR.

960,394.	Specification of Letters Patent.	Patented June 7, 1910.

Application filed August 11, 1909. Serial No. 512,428.

*To all whom it may concern:*

Be it known that I, ABEL W. PICKERING, a citizen of the United States, residing at Joplin, in the county of Jasper and State of Missouri, have invented new and useful Improvements in Wind-Motors, of which the following is a specification.

This invention relates to a novel construction of wind motor, the object in view being to provide a comparatively simple and inexpensive type of motor which dispenses with the use of a complicated tower and tail vane, which embodies a series of horizontally revolving driving vanes turning on a vertical axis and automatically adjustable to set themselves for wind pressure from any quarter, which also embodies effective automatic means for regulating the speed of the motor to any desired extent and securing safety in the operation thereof, and which may be used for raising water for irrigation and other purposes.

With these and other objects in view, the invention consists of the features of construction, combination and arrangement of parts hereinafter fully described and claimed, reference being had to the accompanying drawings, in which:—

Figure 1 is an elevational view of a wind motor embodying my invention. Fig. 2 is a vertical section through one of the coupling or drum casings and associated parts. Fig. 3 is a similar section through the main bearing. Fig. 4 is a fragmentary side view of one of the propeller frames and parts of the automatic brake mechanism. Fig. 5 is a top plan view thereof. Fig. 6 is a horizontal section on line 6—6 of Fig. 2. Fig. 7 is a fragmentary top plan view of the motor.

Referring to the drawings, 1 designates the ground or other suitable base in which are embedded a central anchor 2 and a series of anchors 3. The anchor 2 supports a fixed or stationary shaft 4 extending through an elevated bearing and stay member 5 rigidly supported from the anchors 3 by brace bars or rods 6. The upper end of the shaft 4 carries a crown cap 7 connected with the base by guys 8, whereby said shaft is firmly held in position.

The member 5 is in the form of a hollow box or casing receiving the lower end of a hollow shaft 9 arranged to revolve about the shaft 4 and which turns in said casing on a base bearing 10, preferably of the antifriction ball type. The shaft 9 is composed of a series of sections which are connected by coupling members 11, forming casings revoluble therewith on the shaft 4. Each of said casings, except the uppermost in the series of three shown, incloses a brake drum 12 fixed to the shaft 4, against which drum bears a pair of brake straps 13, each fixed at one end to the casing and at its opposite end to the drum hub of a cog gear 14 journaled in said casing. The straps normally bear loosely against the drum, but are adapted upon the rotation of the gears in one direction to wind thereon and to be thereby drawn taut to exert a braking pressure on the drum.

A hub 15 is keyed to the shaft 9 above each drum casing and supports a pair of oppositely arranged vane carrying frames 16, each including a supporting arm or bar 17. Within each of these frames, which are thus mounted to revolve with the shaft 9, is pivotally mounted a vertical series of parallel vanes 18, arranged to automatically swing to operative position to receive the pressure of the wind blowing from any quarter without the use of a controlling vane at the top. The pressure of the wind on these vanes will cause the applied power to be transmitted to the shaft 9 to rotate the latter. A gear 19 may be suitably mounted on the shaft to mesh with a gear 20 on a driven shaft 21, whereby a pump or other apparatus may be driven. Guys 22 connect the revolving shaft or the hubs with the arms of the vane frames to stay and strengthen the latter. Preferably the vane structures decrease progressively in size and extent of projection upwardly, the vanes of the upper or smallest frame of least power being without speed controlling connections to always apply a certain amount of power when there is an air current. A link 23 connects the vanes of each set for movement in unison.

The supporting arm of each lower vane carrying frame has pivoted thereto, as at 24, a brake arm or bar 25, the inner ends of said bars of adjacent frames being pivoted at their inner ends to rack bars 26, which are vertically movable in the drum casing and engage the cog gears therein. The supporting arm 17 carries at its outer end a governor lever 27 pivoted thereto, at 28, for movement in a vertical plane. The lower arm of this lever is provided with a weight 29, while the upper arm thereof carries a pin 30 pivotally and slidably engaging a slot 31 in the upper end of a link 32 pivoted at its lower end to the arm 25. The outer end of said arm 25 carries an adjustable weight 33 and is connected with the arm 17 by an adjustable stop 33' whereby its motion is limited.

In the rotation of the motor it will be understood that the weighted lever is adapted to swing out by centrifugal force and to have a limited movement without affecting the link 32 through its compensating pin and slot connection therewith. When, however, the speed exceeds that prescribed motion is transmitted through the link to rock the brake arm, whereby the rack bars are actuated to rotate the cog gears and wind up the brake straps, throwing the brake mechanism into action to check the speed of the motor within safety limits. The harder the wind blows, the tighter will be the binding action of the brake mechanism, thus controlling the speed and preventing possibility of damage to the motor.

The outer end vane of each set is provided with a catch loop or member 34 adapted to be engaged by a catch hook or member 35 on a rock shaft 36, carried by a lateral extension of the arm 17, when the vanes are in full-open position. The shaft has a crank arm 37 connected by a link 38 with the brake arm so as to move therewith. This attachment is designed to engage and hold the vanes when wide open to hold them open until the velocity of the motor is checked. When the governor lever moves to a prescribed extent the brake is actuated to check the speed of the motor. Should the wind increase in velocity, the lever will rise farther, whereupon the rock shaft will be turned to lock the vanes in open position, keeping them open until released by the reverse action of the governor.

Having thus described the invention what is claimed as new is:—

1. A wind motor comprising a revolving frame, a propelling device mounted on the frame and provided with a pivoted vane, a locking device for holding the vane in open position, a brake mechanism for controlling the speed of revolution of the revolving frame, and a centrifugal governor controlling said locking device and said brake mechanism.

2. A wind motor comprising a stationary support, a revolving frame carried by said support, propelling devices mounted on the frame, pivoted vanes mounted on each propelling device, a locking device for holding each set of vanes in open position, a brake mechanism associated with each propelling device for controlling the speed of revolution of the revolving frame, and centrifugal governors carried by the vanes and controlling said locking devices and brake mechanism.

3. A wind motor comprising a stationary support, a revolving frame carried by said support, propelling devices having pivoted vanes mounted on the frame, a friction brake controlling the speed of revolution of the frame, a centrifugal governor for operating said brake, and means controlled by the governor for locking and releasing the vanes.

4. A wind motor comprising a stationary shaft, a revolving shaft turning thereon, propelling frames on the revolving shaft, each having pivoted vanes, a friction drum on the stationary shaft, a band arranged to operate on said drum, a gear for tightening and loosening the band, a rack engaging said gear, a rocking arm for operating the rack, and a centrifugal governor for operating said arm.

5. A wind motor comprising a stationary shaft, a revolving shaft, turning thereon, propelling frames on the revolving shaft, each having pivoted vanes, a friction drum on the stationary shaft, a band arranged to operate on said drum, a gear for tightening and loosening the band, a rack engaging said gear, a rocking arm for operating the rack, and a centrifugal governor for operating said arm, and vane locking and releasing means operated by the governor.

6. A wind motor including a revoluble frame, pivoted propelling vanes mounted thereon, a locking device to hold the vanes open, a brake mechanism for controlling the speed of revolution of the frame, and a centrifugal governor controlling said locking device and brake mechanism.

In testimony whereof I affix my signature in presence of two witnesses.

ABEL W. PICKERING.

Witnesses:
W. R. HAUGHAWOUT,
A. A. RUSSELL.